(12) United States Patent
Nishiyama et al.

(10) Patent No.: US 10,947,627 B2
(45) Date of Patent: Mar. 16, 2021

(54) WATER ELECTROLYSIS APPARATUS (71) Applicant: HONDA MOTOR CO., LTD., Tokyo (JP)

(72) Inventors: Tadashi Nishiyama, Wako (JP); Hiroshi Shinkai, Wako (JP); Akihiro Noda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 16/223,213

(22) Filed: Dec. 18, 2018

(65) Prior Publication Data
US 2019/0194813 A1    Jun. 27, 2019

(30) Foreign Application Priority Data

Dec. 21, 2017    (JP) .............................. JP2017-245164

(51) Int. Cl.
| | |
|---|---|
| *C25B 9/08* | (2006.01) |
| *C25B 9/16* | (2006.01) |
| *C25B 1/12* | (2006.01) |
| *C25B 15/08* | (2006.01) |
| *C25B 15/02* | (2021.01) |
| *C25B 9/20* | (2006.01) |

(52) U.S. Cl.
CPC ................. *C25B 1/12* (2013.01); *C25B 9/20* (2013.01); *C25B 15/02* (2013.01); *C25B 15/08* (2013.01)

(58) Field of Classification Search
CPC .... C25B 9/08; C25B 1/02; C25B 9/00; C25B 9/206; C25B 1/08; C25B 9/045; C25B 9/16
See application file for complete search history.

(56) References Cited

U.S. PATENT DOCUMENTS

2016/0122885 A1    5/2016  Ishikawa et al.

FOREIGN PATENT DOCUMENTS

JP    2016-89220    5/2016

*Primary Examiner* — Zulmariam Mendez
(74) *Attorney, Agent, or Firm* — Amin, Turocy & Watson LLP (57) ABSTRACT

A hydrogen communication hole of a water electrolysis apparatus is formed to penetrate in a stacking direction through an anode separator, an electrolyte membrane, and a cathode separator. A communication hole body, which is disposed between an anode current collector and the hydrogen communication hole, includes an inside member facing toward the hydrogen communication hole, and an outside member facing toward the anode current collector. On the outside member, there are provided accommodating chambers in which seal members are accommodated, and an opposing surface that faces toward the inside member without the seal members being interposed therebetween. The accommodating chambers and the hydrogen communication hole communicate via through holes, which are formed in the inside member in a manner so that openings on one end thereof face toward the opposing surface, and openings on another end thereof face toward the hydrogen communication hole.

6 Claims, 4 Drawing Sheets

WATER ELECTROLYSIS APPARATUS

CROSS-REFERENCE TO RELATED APPLICATION

This application is based upon and claims the benefit of priority from Japanese Patent Application No. 2017-245164 filed on Dec. 21, 2017, the contents of which are incorporated herein by reference.

BACKGROUND OF THE INVENTION

Field of the Invention

The present invention relates to a water electrolysis apparatus which generates hydrogen by electrolysis of water.

Description of the Related Art

As a water electrolysis apparatus which generates hydrogen (and oxygen) by electrolysis of water, an apparatus is known in which an electrolyte membrane made of a solid polymer is used. More specifically, a membrane electrode assembly is constituted by providing electrode catalyst layers on both surfaces of an electrolyte membrane, and together therewith, a water electrolysis cell is constituted by providing power feeding bodies and separators on both sides of the membrane electrode assembly. A plurality of the water electrolysis cells are stacked to thereby make up the water electrolysis apparatus.

In this type of water electrolysis apparatus, a hydrogen communication hole is formed as a flow passage for hydrogen that is generated by the electrode catalyst layer on the cathode side. Locations existing between the hydrogen communication hole and the oxygen-generating electrode catalyst layer on the anode side, the power feeding bodies, and the like are sealed by seal members. Since accommodating chambers in which the seal members are accommodated communicate with the hydrogen communication hole, when the hydrogen communication hole, which has been raised in pressure by introduction of hydrogen therein, is reduced in pressure (depressurized), the interiors of the accommodating chambers are also reduced in pressure. In order to allow the hydrogen to flow smoothly from the accommodating chambers to the hydrogen communication hole, while preventing damage from occurring to the seal members when the pressure is reduced, for example, as disclosed in Japanese Laid-Open Patent Publication No. 2016-089220, it has been proposed to interpose a porous member made of a porous material between the hydrogen communication hole and the accommodating chambers, so as to allow the hydrogen communication hole to communicate with the accommodating chambers via the pores of the porous member.

SUMMARY OF THE INVENTION

The present invention has been devised in relation to this type of technology, and a principal object of the present invention is to provide a water electrolysis apparatus in which, even if an economical material which can be obtained more easily than a porous material is used instead of the porous material, it is possible to enable gas in an accommodating chamber to flow smoothly to a hydrogen communication hole, while preventing damage from occurring to a seal member at a time that the hydrogen communication hole is reduced in pressure.

According to an embodiment of the present invention, a water electrolysis apparatus is provided, which is equipped with an anode separator and a cathode separator that are stacked with an electrolyte membrane sandwiched therebetween, an anode current collector interposed between the anode separator and the electrolyte membrane, and a cathode current collector interposed between the electrolyte membrane and the cathode separator, the water electrolysis apparatus being configured to generate hydrogen by electrolysis of water on a side of the cathode current collector, and further comprising a hydrogen communication hole, which is formed to penetrate in a stacking direction through the anode separator, the electrolyte membrane, and the cathode separator, and allows the hydrogen to flow therethrough, and a communication hole body disposed between the anode current collector and the hydrogen communication hole, wherein the communication hole body has an inside member facing toward the hydrogen communication hole, and an outside member disposed between the inside member and the anode current collector, on a side of the outside member that faces toward the inside member, there are provided an accommodating chamber, which is interposed between the outside member and the inside member, and accommodates a seal member that seals the hydrogen communication hole and a side of the anode current collector, and an opposing surface that faces toward the inside member without the seal member being interposed therebetween, and the accommodating chamber and the hydrogen communication hole communicate via a through hole, which is formed in the inside member in a manner so that an opening on one end thereof faces toward the opposing surface, and an opening on another end thereof faces toward the hydrogen communication hole.

In the water electrolysis apparatus, for example, in the case that the hydrogen communication hole is reduced in pressure (depressurized), a gas such as hydrogen or the like inside the accommodating chamber flows from a location between the inside member and the opposing surface of the outside member, and is guided into the hydrogen communication hole via the through hole that is formed in the inside member. The opening on the one end of the through hole faces toward the opposing surface, and it is avoided that the opening faces toward the seal member. Therefore, it is possible to prevent the through hole from being blocked by the seal member. Further, it is possible to suppress the occurrence of large stresses acting on the seal member, due to a portion of the seal member being deformed so as to enter into the interior of the through hole, or by being pressed against a circumferential edge of the opening of the through hole or the like.

Therefore, in accordance with the water electrolysis apparatus, regardless of whether or not the inside member is made of a porous material, it is possible to enable gas in the accommodating chamber to flow smoothly to the hydrogen communication hole, while preventing damage from occurring to the seal member at a time that the hydrogen communication hole is reduced in pressure. Stated otherwise, even if the inside member is constituted from an economical material which can be obtained more easily than a porous material, for example, a gas impermeable material or a material having a gas permeability lower than that of a porous material or the like, the above-described advantageous effects can be suitably obtained.

In the above-described water electrolysis apparatus, a length in the stacking direction of the opening on the one end of the through hole is preferably smaller than a length in the stacking direction of the opposing surface. In this case, the opening on the one end of the through hole and the accommodating chamber can be separated from each other in the stacking direction. Consequently, it is possible to more reliably avoid a situation in which the seal member closes the through hole, or in which large stresses acting locally on the seal member are generated at a time that the hydrogen communication hole is reduced in pressure.

In the above-described water electrolysis apparatus, a length in the stacking direction of the accommodating chamber is preferably set in a manner so that the seal member, which is accommodated in the accommodating chamber, is maintained in a state of being compressed in the stacking direction, a cross section of the through hole perpendicular to an extending direction thereof is of a circular shape, and a diameter of the through hole is preferably smaller than the length in the stacking direction of the accommodating chamber. By setting the length of the accommodating chamber in the stacking direction as described above, the sealing property of the seal member can be exerted in a suitable manner. Further, by making the diameter of the through hole smaller than the length in the stacking direction of the accommodating chamber which is set in this manner, and by adjusting the flow rate of the gas that passes through the through hole, the above-described advantageous effects can be more suitably obtained.

In the water electrolysis apparatus, the opposing surface and the inside member are preferably separated by a distance that is smaller than the diameter of the through hole. In this case, while the seal member is prevented from blocking a passage between the opposing surface and the inside member, the gas in the accommodating chamber can be suitably guided into the opening on the one end of the through hole via the passage between the opposing surface and the inside member. As a result, it is possible to obtain the aforementioned advantageous effects in a more appropriate manner.

In the above-described water electrolysis apparatus, a plurality of the through holes preferably are formed in the inside member at intervals in a circumferential direction of the hydrogen communication hole. In this case, when the hydrogen communication hole is reduced in pressure, the flow rate of the gas that flows into the hydrogen communication hole from the accommodating chamber via the plurality of through holes can easily be adjusted to an appropriate size, and therefore, the above-described advantageous effects can be obtained in a more favorable manner.

In the above-described water electrolysis apparatus, the inside member preferably is made of a resin material. In this case, the inside member can be constructed in a more simple and economical manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a water electrolysis apparatus according to the present invention will be presented and described in detail below with reference to the accompanying drawings. In the drawings to be referred to below, constituent elements that exhibit the same or similar functions and effects are denoted with the same reference characters, and repeated description of such features is omitted.

Figure 1:
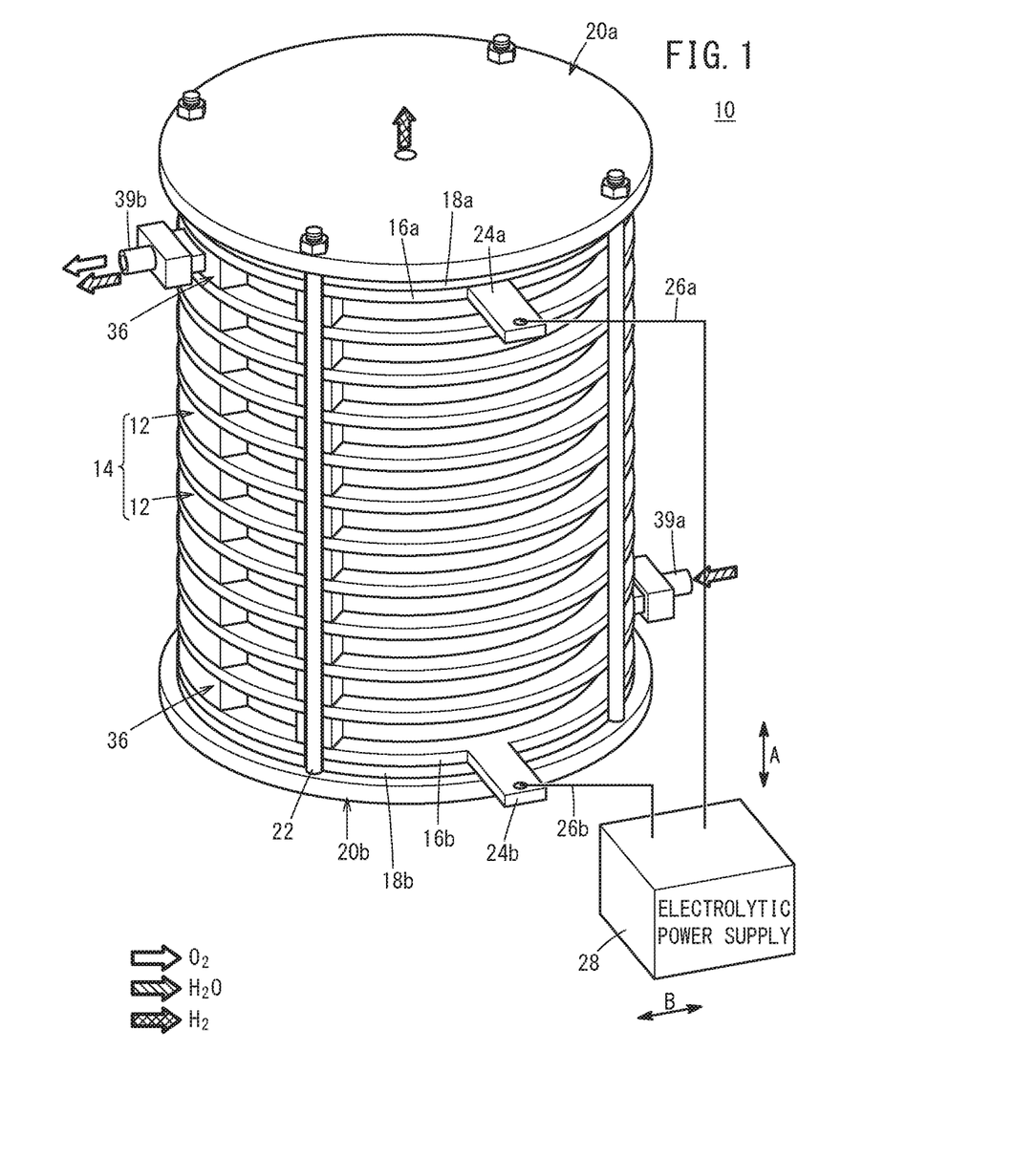
FIG. 1 is an explanatory view shown in perspective of a water electrolysis apparatus according to an embodiment of the present invention.

In the present embodiment, as shown in FIG. 1, a case will be presented and described as an example in which the water electrolysis apparatus 10 is a differential pressure water electrolysis apparatus that produces oxygen on an anode side by electrolysis of water, whereas on the cathode side, hydrogen is produced having a higher pressure than the oxygen. However, the present invention is not particularly limited to this example.

The water electrolysis apparatus 10 comprises a stacked body 14 in which a plurality of water electrolysis cells 12 are stacked in a vertical direction (the direction of the arrow A) or in a horizontal direction (the direction of the arrow B). A terminal plate 16a, an insulating plate 18a, and an end plate 20a are sequentially arranged in an upward direction at one end (upper end) in the stacking direction of the stacked body 14. Similarly, a terminal plate 16b, an insulating plate 18b, and an end plate 20b are sequentially arranged in a downward direction at the other end (lower end) in the stacking direction of the stacked body 14.

In the water electrolysis apparatus 10, the end plates 20a and 20b, each having a disc-like shape, are integrally tightened and held by a pressing mechanism, for example, four tie rods 22 extending in the direction of the arrow A, and are fastened in the stacking direction. Moreover, the water electrolysis apparatus 10 may also be retained together integrally by a box-like casing (not shown) including the end plates 20a and 20b as end plates thereof. Further, although the water electrolysis apparatus 10 has a substantially cylindrical columnar shape as a whole, the overall shape thereof can be set to any of various shapes, such as a cubic shape.

Terminal portions 24a and 24b are provided in an outwardly projecting manner on side portions of the terminal plates 16a and 16b. The terminal portions 24a and 24b are electrically connected via wirings 26a and 26b to an electrolytic power supply 28.

Figure 2:
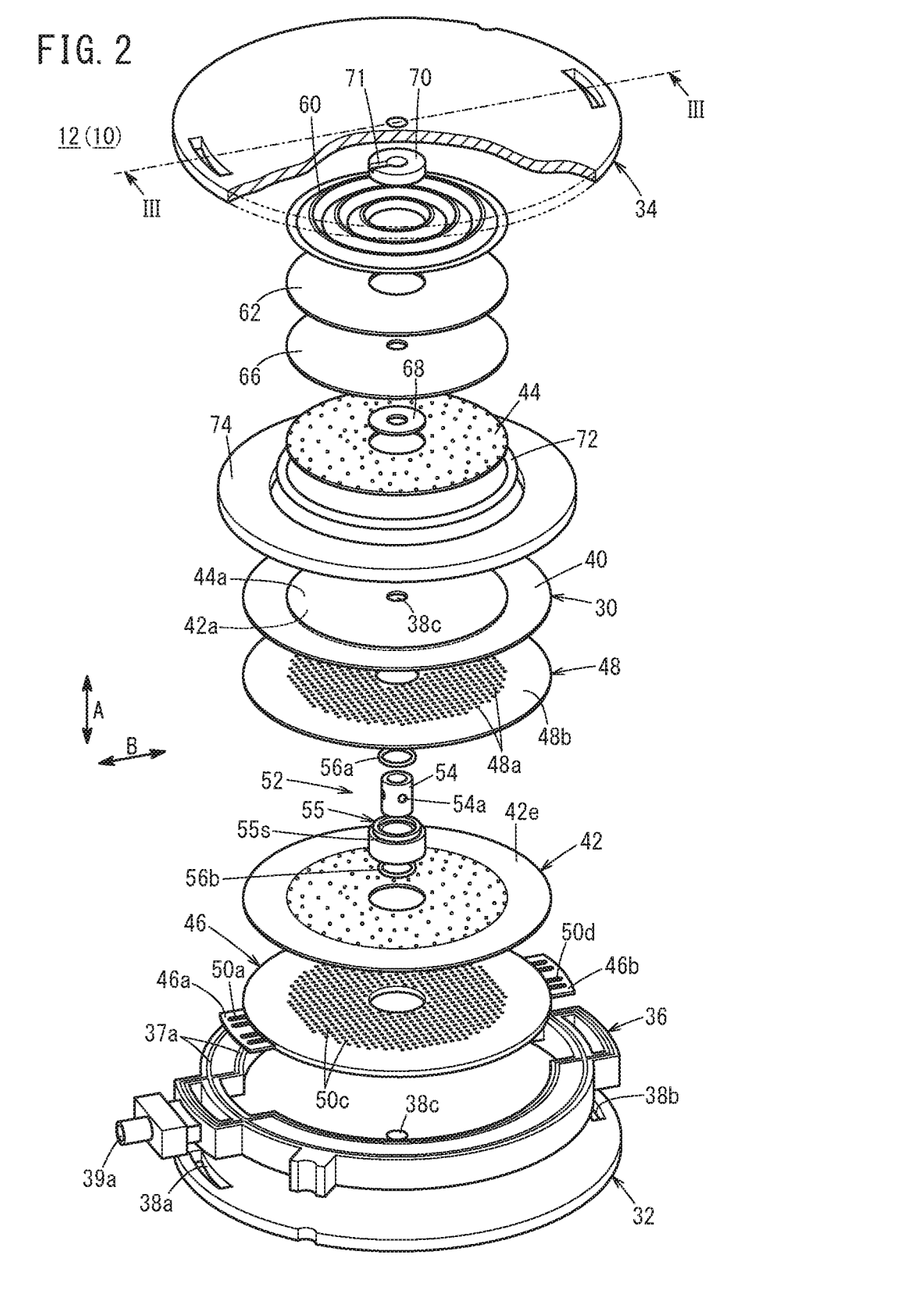
FIG. 2 is an exploded perspective view of a water electrolysis cell that constitutes part of the water electrolysis apparatus of FIG. 1.
Figure 3:
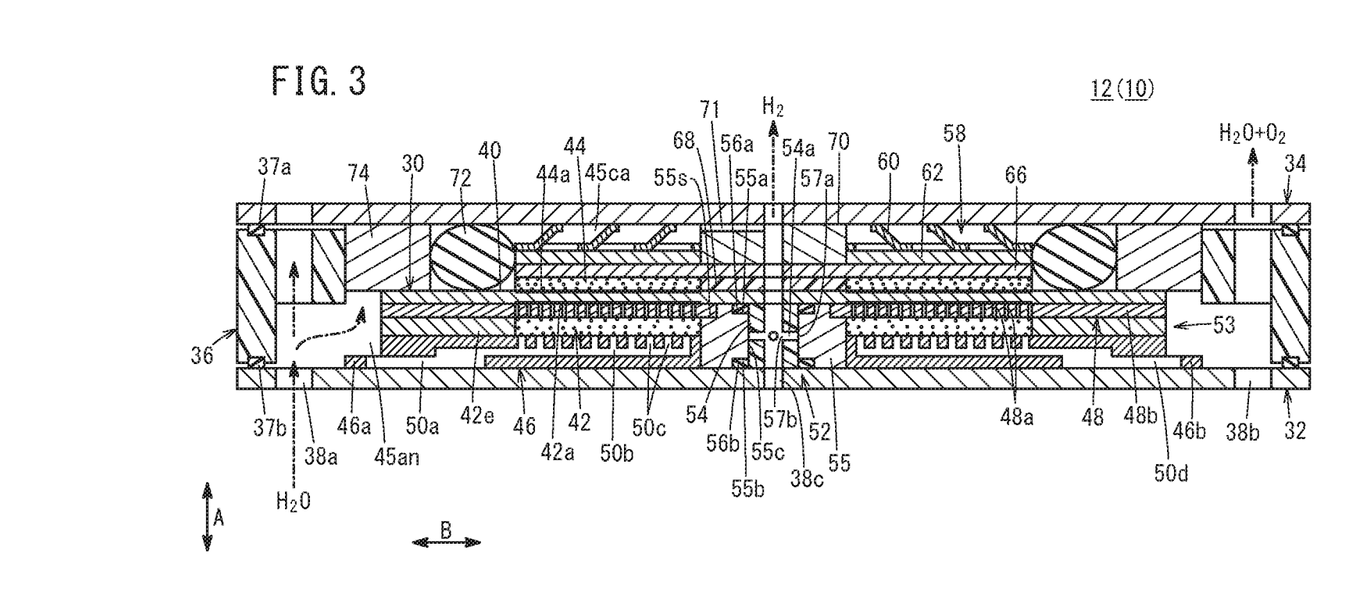
FIG. 3 is a cross-sectional view taken along line III-III of FIG. 2.

As shown in FIGS. 2 and 3, each of the water electrolysis cells 12 includes a substantially disc-shaped membrane electrode assembly 30, and an anode separator 32 and a cathode separator 34 which sandwich the membrane electrode assembly 30 therebetween. Between the anode separator 32 and the cathode separator 34, a resin frame member 36 is disposed in surrounding relation to the membrane electrode assembly 30.

The resin frame member 36 is of a substantially ring-like shape, and seal members 37a and 37b are provided on both surfaces of the resin frame member 36. On one end in a diametrical direction of the resin frame member 36, a water supplying communication hole 38a for supplying water (pure water) is provided in mutual communication therewith in the stacking direction (the direction of the arrow A). On the other end in the diametrical direction of the resin frame member 36, a water discharging communication hole 38b is provided for discharging the oxygen generated by the reaction and unreacted water (a mixed fluid).

As shown in FIG. 1, a water supply port 39a communicating with the water supplying communication hole 38a (see FIG. 3) is connected to a side portion of the resin frame member 36 which is arranged at a lowermost position in the stacking direction. A water discharge port 39b communicating with the water discharging communication hole 38b (see FIG. 3) is connected to a side portion of the resin frame member 36 which is arranged at an uppermost position in the stacking direction.

In a central portion of the water electrolysis cell 12, a hydrogen communication hole 38c is provided (see FIGS. 2 to 4) which penetrates substantially through the center of an electrolysis region along the stacking direction. The hydrogen communication hole 38c discharges high-pressure hydrogen (hydrogen having a pressure, for example, from 1 MPa to 80 MPa, which is higher than that of the generated oxygen) generated by the reaction.

The anode separator 32 and the cathode separator 34 are substantially disc-shaped and are made, for example, of a carbon member or the like. Apart therefrom, the anode separator 32 and the cathode separator 34 may be formed by press forming a steel plate, a stainless steel plate, a titanium plate, an aluminum plate, a steel plate subjected to a plating process, or alternatively, a metal plate subjected to an anti-corrosive surface treatment on the metal surface thereof. Alternatively, the anode separator 32 and the cathode separator 34 may be formed by applying an anti-corrosive surface treatment after having carried out a machining process.

The membrane electrode assembly 30 comprises a solid polymer electrolyte membrane (electrolyte membrane) 40 having a substantially ring-like shape. The electrolyte membrane 40 is sandwiched between an anode current collector 42 and a cathode current collector 44 for electrolysis, which have a ring-like shape. The electrolyte membrane 40 is configured from a hydrocarbon (HC)-based membrane or a fluorine-based membrane, for example.

The hydrogen communication hole 38c is formed in a substantially central portion of the electrolyte membrane 40. An anode catalyst layer 42a having a ring-like shape is provided on one surface of the electrolyte membrane 40. A cathode catalyst layer 44a having a ring-like shape is formed on the other surface of the electrolyte membrane 40. The anode catalyst layer 42a uses a ruthenium (Ru)-based catalyst, and the cathode catalyst layer 44a uses a platinum catalyst, for example.

The anode current collector 42 and the cathode current collector 44 are constituted, for example, from a spherical gas atomizing titanium powder sintered compact (porous conductor), for example. The anode current collector 42 and the cathode current collector 44 are provided with a smooth surface portion on which an etching process is performed after grinding, and the porosity thereof is set within a range of 10% to 50%, and more preferably, within a range of 20% to 40%. A frame portion 42e is fitted onto an outer circumferential edge portion of the anode current collector 42. The frame portion 42e is constituted more densely than the anode current collector 42. Moreover, by constituting the outer circumferential portion of the anode current collector 42 densely, the outer circumferential portion can also serve as the frame portion 42e.

The anode separator 32 forms an anode chamber 45an in which the anode current collector 42 is housed. The cathode separator 34 forms a cathode chamber 45ca in which the cathode current collector 44 is housed.

A water flow passage member 46 is interposed at a location (the anode chamber 45an) between the anode separator 32 and the anode current collector 42, and a protective sheet member 48 is interposed at a location between the anode current collector 42 and the anode catalyst layer 42a. As shown in FIG. 2, the water flow passage member 46 has a substantially disc-like shape, and an inlet protrusion 46a and an outlet protrusion 46b, which are mutually opposed in the diametrical direction, are formed on an outer circumferential portion thereof.

A supply connection path 50a, which communicates with the water supplying communication hole 38a, is formed in the inlet protrusion 46a, together with the supply connection path 50a communicating with a water flow passage 50b (see FIG. 3). A plurality of holes 50c communicate with the water flow passage 50b, and the holes 50c open toward the anode current collector 42. A discharge connection path 50d, which communicates with the water flow passage 50b, is formed in the outlet protrusion 46b, and the discharge connection path 50d communicates with the water discharging communication hole 38b.

The inner circumference of the protective sheet member 48 is disposed inside the inner circumference of the anode current collector 42 and the cathode current collector 44, together with the outer circumferential position thereof being set at the same position as the outer circumferential positions of the electrolyte membrane 40, the anode current collector 42, and the water flow passage member 46. The protective sheet member 48 has a plurality of through holes 48a provided within a range (electrolytic region) that faces toward the anode catalyst layer 42a in the stacking direction. The protective sheet member 48 includes a frame portion 48b on the outer side of the electrolytic region. Rectangular holes (not shown) are formed in the frame portion 48b.

Figure 4:
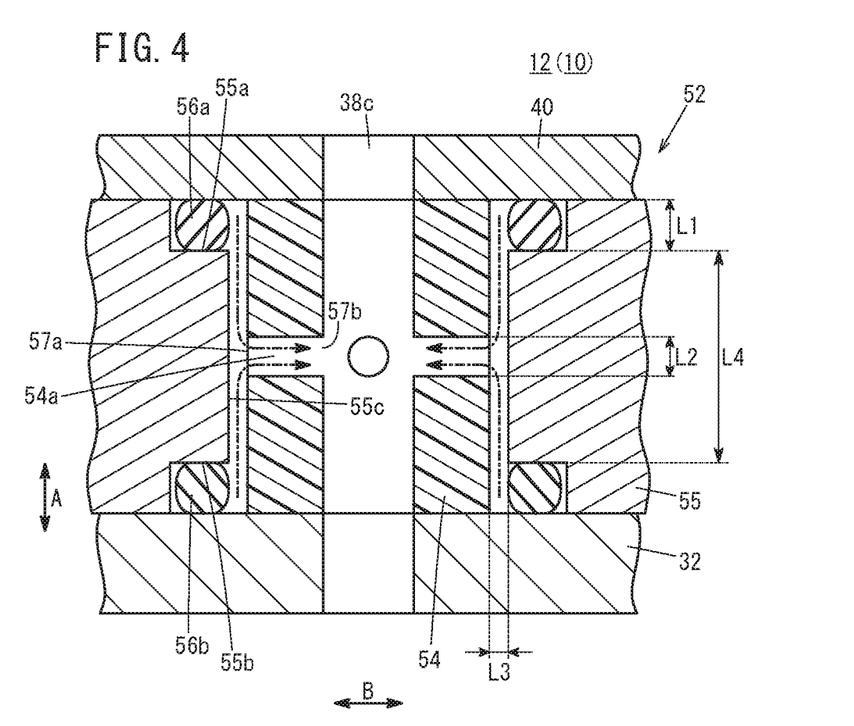
FIG. 4 is an enlarged view of a principal part of a communication hole body shown in FIG. 3.

As shown in FIGS. 3 and 4, a substantially cylindrical communication hole body 52 that surrounds the hydrogen communication hole 38c is disposed between the anode separator 32 and the electrolyte membrane 40 in the stacking direction. In the following description, the water flow passage member 46, the anode current collector 42, and the protective sheet member 48 are collectively referred to as anode side members 53. In this case, the communication hole body 52 is arranged between the hydrogen communication hole 38c and the anode side members 53 in the diametrical direction of the hydrogen communication hole 38c.

The communication hole body 52 includes an inside member 54 that faces toward the hydrogen communication hole 38c and is made of resin, and an outside member 55 disposed between the inside member 54 and the anode side members 53. Concerning the resin material of the inside member 54, as a preferred example thereof from the standpoint of durability and economy, a fiber reinforced plastic (FRP) such as glass epoxy or the like may be cited. However, the resin material is not particularly limited to this feature, and may be any material insofar as it is capable of withstanding the pressure of the hydrogen that is filled in the hydrogen communication hole 38c. Moreover, the inside member 54 may be configured so as to be gas impermeable, or to exhibit a smaller gas permeability than that of a porous material.

In the present embodiment, four individual through holes 54a are provided in the inside member 54 at intervals in the circumferential direction of the hydrogen communication hole 38c. The through holes 54a extend along a diametrical direction of the hydrogen communication hole 38c, and cross sections thereof perpendicular to the direction in which the through holes 54a extend are of a circular shape.

Accommodating chambers 55a and 55b and an opposing surface 55c are provided on a side of the outside member 55 that faces toward the inside member 54. The accommodating chambers 55a, 55b are formed by cutting out both ends of the outside member 55 in ring-like shapes in the axial direction (stacking direction), and seal members (O-rings) 56a and 56b are arranged in the accommodating chambers 55a and 55b in surrounding relation to the hydrogen communication hole 38c. Owing to this feature, the hydrogen communication hole 38c and the anode chamber 45an (on the side of the anode current collector 42) are sealed. As shown in FIG. 4, a length (sealing gap) L1 in the stacking direction of the accommodating chambers 55a and 55b is set in a manner so that the seal members 56a and 56b are maintained in a state of being compressed in the stacking direction, and so as to be larger than the diameter L2 of the through holes 54a.

The opposing surface 55c is disposed between the accommodating chambers 55a and 55b in the stacking direction, and faces toward the inside member 54 without the seal members 56a and 56b being interposed therebetween. As shown in FIG. 4, an interval L3, which is smaller than the diameter L2 of the through holes 54a, is formed between the opposing surface 55c and the inside member 54. In the respective plurality of through holes 54a that are provided in the inside member 54, an opening 57a on one end thereof faces toward the opposing surface 55c, and an opening 57b on the other end thereof faces toward the hydrogen communication hole 38c. Further, a length L4 of the opposing surface 55c in the stacking direction is larger than the diameter of the openings 57a at the one end of the through holes 54a (which is the same as the diameter L2 of the through holes 54a in the present embodiment).

As shown in FIGS. 2 and 3, on a side of the outside member 55 facing toward the anode side members 53, a groove portion 55s on which the protective sheet member 48 is disposed is formed on an end surface thereof that faces toward the electrolyte membrane 40.

The cathode current collector 44, and a load applying mechanism 58 which presses the cathode current collector 44 against the electrolyte membrane 40 are disposed in the cathode chamber 45ca. The load applying mechanism 58 is equipped with an elastic member, for example, a plate spring 60, and the plate spring 60 applies a load to the cathode current collector 44 via a metal plate spring holder (shim member) 62. As the elastic member, in addition to the plate spring 60, a disc spring, a coil spring, or the like may be used.

A conductive sheet 66 is disposed between the cathode current collector 44 and the plate spring holder 62. The conductive sheet 66 is constituted, for example, from a metal sheet of titanium, SUS, iron, or the like, includes a ring-like shape, and is set to have substantially the same diameter as that of the cathode current collector 44.

In a central portion of the cathode current collector 44, a resin sheet 68, for example, is disposed as an insulating member that is positioned between the conductive sheet 66 and the electrolyte membrane 40. The resin sheet 68 is fitted into an inner circumferential surface of the cathode current collector 44. The thickness of the resin sheet 68 is set to be substantially the same as that of the cathode current collector 44. As the resin sheet 68, for example, PEN (polyethylene naphthalate), a polyimide film, or the like may be used.

A cylindrical member 70 is disposed between the resin sheet 68 and the cathode separator 34. The cylindrical member 70 has a cylindrical shape, and the hydrogen communication hole 38c is formed in a central portion thereof. At one end in the axial direction of the cylindrical member 70, a hydrogen discharge passage 71 is formed that communicates with the cathode chamber 45ca and the hydrogen communication hole 38c.

In the cathode chamber 45ca, a seal member (O-ring) 72 is arranged around the outer circumference of the cathode current collector 44, the plate spring holder 62, and the conductive sheet 66. A pressure resistant member 74 is disposed on the outer circumference of the seal member 72. The pressure resistant member 74 has a substantially ring-like shape, together with the outer circumferential portion thereof being fitted into the inner circumferential portion of the resin frame member 36.

Operations of the water electrolysis apparatus 10, which is configured basically in the manner described above, will be described below.

As shown in FIG. 1, water is supplied from the water supply port 39a to the water supplying communication hole 38a (see FIG. 2) of the water electrolysis apparatus 10, and a voltage is applied via the electrolytic power supply 28 to the terminal portions 24a and 24b of the terminal plates 16a and 16b. Therefore, as shown in FIG. 3, in each of the water electrolysis cells 12, water is supplied from the water supplying communication hole 38a to the water flow passage 50b of the water flow passage member 46 through the supply connection path 50a. The water is supplied to the anode current collector 42 from the plurality of holes 50c, and moves into the interior of the anode current collector 42.

Accordingly, the water is decomposed by electricity at the anode catalyst layer 42a, and hydrogen ions, electrons, and oxygen are generated. The hydrogen ions generated by such an anodic reaction permeate through the electrolyte membrane 40, move to the side of the cathode catalyst layer 44a, and are combined with electrons to thereby obtain hydrogen.

Therefore, the hydrogen flows along a hydrogen flow passage inside the cathode current collector 44, and the hydrogen is discharged from the hydrogen discharge passage 71 into the hydrogen communication hole 38c. The hydrogen flows through the hydrogen communication hole 38c, in a state of being maintained at a higher pressure than the water supplying communication hole 38a, and can be ejected to the exterior of the water electrolysis apparatus 10. On the other hand, the oxygen generated by the reaction and unreacted water are discharged to the exterior of the water electrolysis apparatus 10 from the water discharging communication hole 38b via the water discharge port 39b.

Subsequently, when the operation of the water electrolysis apparatus 10 is stopped, in order to eliminate a pressure difference between the anode chamber 45an on a side where the pressure is normal and the cathode chamber 45ca on a side where the pressure is high, a pressure reduction (depressurization) process is performed in the cathode chamber 45ca.

In this case, in the present embodiment, as indicated by the one-dot dashed line arrows in FIG. 4, the hydrogen in the accommodating chambers 55a and 55b is guided to the hydrogen communication hole 38c via the through holes 54a that are formed in the inside member 54, from between the opposing surface 55c of the outside member 55 and the inside member 54. The openings 57a on the one end of the through holes 54a face toward the opposing surface 55c, and it is avoided that the openings 57a face toward the seal members 56a and 56b. Therefore, it is possible to prevent the through holes 54a from being blocked by the seal members 56a and 56b. Further, it is possible to suppress the occurrence of large stresses acting on the seal members 56a and 56b, due to portions of the seal members 56a and 56b being deformed so as to enter into the interior of the through holes 54a, or by being pressed against a circumferential edge of the openings 57a of the through holes 54a or the like.

Therefore, in accordance with the water electrolysis apparatus 10, regardless of whether or not the inside member 54 is made of a porous material, it is possible to enable gas in the accommodating chambers 55a and 55b to flow smoothly to the hydrogen communication hole 38c, while preventing damage from occurring to the seal members 56a and 56b at a time that the hydrogen communication hole 38c is reduced in pressure. Stated otherwise, even if the inside member 54 is constituted from an economical material which can be obtained more easily than a porous material, for example, a gas impermeable material or a material having a gas permeability lower than that of a porous material or the like, the above-described advantageous effects can be suitably obtained.

As described above, in the water electrolysis apparatus 10, the length L2 in the stacking direction of the openings 57a on the one end of the through holes 54a is smaller than the length L4 in the stacking direction of the opposing surface 55c. Consequently, since the openings 57a on the one end of the through holes 54a and the accommodating chambers 55a and 55b can be separated from each other in the stacking direction, at a time that the hydrogen communication hole 38c is reduced in pressure, it is possible to more reliably avoid a situation in which the seal members 56a and 56b close the through holes 54a, or in which large stresses acting locally on the seal members 56a and 56b are generated.

As described above, in the water electrolysis apparatus 10, a length L1 in the stacking direction of the accommodating chambers 55a and 55b is set in a manner so that the seal members 56a and 56b, which are accommodated in the accommodating chambers 55a and 55b, are maintained in a state of being compressed in the stacking direction, and therefore, the sealing property of the seal members 56a and 56b can be exerted in a suitable manner. Further, by making the diameter L2 of the through holes 54a smaller than the length L1 in the stacking direction of the accommodating chambers 55a and 55b which are set in this manner, and by adjusting the flow rate of the gas that passes through the through holes 54a, the above-described advantageous effects can be more suitably obtained.

As described above, in the water electrolysis apparatus 10, the opposing surface 55c and the inside member 54 are opposed to each other at the interval L3 which is smaller than the diameter L2 of the through holes 54a. In accordance with this feature, while the seal members 56a and 56b are prevented from blocking a passage between the opposing surface 55c and the inside member 54, the gas in the accommodating chambers 55a and 55b can be suitably guided into the openings 57a on the one end of the through holes 54a via the passage between the opposing surface 55c and the inside member 54. As a result, it is possible to obtain the aforementioned advantageous effects in a more appropriate manner.

As described above, in the water electrolysis apparatus 10, since a plurality of the through holes 54a are formed in the inside member 54 at intervals in the circumferential direction of the hydrogen communication hole 38c, when the hydrogen communication hole 38c is reduced in pressure, the flow rate of the gas that flows into the hydrogen communication hole 38c from the accommodating chambers 55a and 55b via the plurality of through holes 54a can easily be adjusted to an appropriate size, and the above-described advantageous effects can be obtained in a more favorable manner.

As described above, in the water electrolysis apparatus 10, since the inside member 54 is made of a resin material, the inside member 54 can be constructed in a more simple and economical manner.

The present invention is not particularly limited to the embodiment described above, and various modifications can be adopted therein without departing from the essence and gist of the present invention.

For example, in the water electrolysis apparatus 10 according to the above-described embodiment, the direction in which the through holes 54a extend lies along a diametrical direction (the direction of the arrow B) of the hydrogen communication hole 38c. However, the invention is not particularly limited to this feature, and the direction of extension of the through holes 54a may be inclined with respect to the radial direction of the hydrogen communication hole 38c, or may be bent midway in the direction of extension. Further, the cross-sectional shape of the through holes 54a perpendicular to the direction of extension thereof is not limited to being a circular shape in particular.

In the water electrolysis apparatus 10 according to the above-described embodiment, the diameter L2 of the through holes 54a is smaller than the length L1 in the stacking direction of the accommodating chambers 55a and 55b. However, the diameter L2 of the through holes 54a can be appropriately adjusted in a manner so that the flow rate of the gas that passes through the through holes 54a takes place at an appropriate value. The number of the through holes 54a that are formed in the inside member 54 is not limited to four, and may be one or a plurality other than four. The distance L3 between the opposing surface 55c and the inside member 54 can also be adjusted in an appropriate manner so that the gas in the accommodating chambers 55a and 55b is capable of being guided suitably to the openings 57a on the one end of the through holes 54a via the passage between the opposing surface 55c and the inside member 54.

In the water electrolysis apparatus 10 according to the above-described embodiment, one end surface (an upper end surface) in the axial direction of the inside member 54 abuts against the electrolyte membrane 40, and the other end surface (a lower end surface) thereof abuts against the anode separator 32. However, the inside member 54 may be provided in a manner so that the length thereof in the stacking direction is substantially equivalent to the length of the plurality of individual water electrolysis cells 12 in the stacking direction, so as to integrally surround the hydrogen communication holes 38c of the plurality of water electrolysis cells 12. In this case, in the water electrolysis cells 12, a hole portion (not shown) having a larger diameter than that of the hydrogen communication holes 38c is provided integrally between the anode separators 32 and the cathode separators 34, and concentrically with the hydrogen communication holes 38c, and the inside member 54 is inserted into such a hole portion.

In the water electrolysis apparatus 10, even in the case that the inside member 54 is constituted from any arbitrary material which is not limited to being a resin material, it is possible to enable the gas in the accommodating chambers 55a and 55b to flow smoothly to the hydrogen communication hole 38c, while preventing damage from occurring to the seal members 56a and 56b at a time that the hydrogen communication hole 38c is reduced in pressure.

What is claimed is:

1. A water electrolysis apparatus equipped with an anode separator and a cathode separator that are stacked with an electrolyte membrane sandwiched therebetween, an anode current collector interposed between the anode separator and the electrolyte membrane, and a cathode current collector interposed between the electrolyte membrane and the cathode separator, the water electrolysis apparatus being configured to generate hydrogen by electrolysis of water on a side of the cathode current collector, and further comprising:
   a hydrogen communication hole, which is formed to penetrate in a stacking direction through the anode separator, the electrolyte membrane, and the cathode separator, and allows the hydrogen to flow therethrough; and
   a communication hole body disposed between the anode current collector and the hydrogen communication hole;
   wherein,
   the communication hole body has an inside member facing toward the hydrogen communication hole, and an outside member disposed between the inside member and the anode current collector wherein the inside member is formed of a material which is gas impermeable or exhibits a smaller gas permeability than a gas permeability of a porous material;
   on a side of the outside member that faces toward the inside member, there are provided an accommodating chamber, which is interposed between the outside member and the inside member, and accommodates a seal member that seals the hydrogen communication hole and a side of the anode current collector, and an opposing surface that faces toward the inside member without the seal member being interposed therebetween;
   the inside member includes a through hole, which is formed in the inside member in a manner so that an opening on one end thereof faces toward the opposing surface, and an opening on another end thereof faces toward the hydrogen communication hole;
   the opening on the one end of the through hole is distanced from the accommodating chamber; and
   the accommodating chamber and the hydrogen communication hole communicate via the through hole and a gap between the opposing surface of the outside member and the inside member.

2. The water electrolysis apparatus according to claim 1, wherein a length in the stacking direction of the opening on the one end of the through hole is smaller than a length in the stacking direction of the opposing surface.

3. The water electrolysis apparatus according to claim 1, wherein:
   a length in the stacking direction of the accommodating chamber is set in a manner so that the seal member which is accommodated in the accommodating chamber is maintained in a state of being compressed in the stacking direction;
   a cross section of the through hole perpendicular to an extending direction thereof is of a circular shape; and
   a diameter of the through hole is smaller than the length in the stacking direction of the accommodating chamber.

4. The water electrolysis apparatus according to claim 3, wherein the opposing surface and the inside member are separated by a distance that is smaller than the diameter of the through hole.

5. The water electrolysis apparatus according to claim 1, wherein a plurality of the through holes are formed in the inside member at intervals in a circumferential direction of the hydrogen communication hole.

6. The water electrolysis apparatus according to claim 1, wherein the inside member is made of resin.

* * * * *